United States Patent [19]

Takaya et al.

[11] Patent Number: 5,029,073
[45] Date of Patent: Jul. 2, 1991

[54] METHOD FOR FAST ESTABLISHING A CO-PROCESSOR TO MEMORY LINKAGE BY MAIN PROCESSOR

[75] Inventors: Soichi Takaya; Yoshihiro Miyazaki, both of Hitachi, Japan

[73] Assignee: Hitachi, Ltd., Tokyo, Japan

[21] Appl. No.: 836,820

[22] Filed: Mar. 6, 1986

[30] Foreign Application Priority Data

Mar. 8, 1985 [JP] Japan ............................. 60-44852

[51] Int. Cl.⁵ .................. G06F 13/00; G06F 15/16
[52] U.S. Cl. ............................. 364/200; 364/228.6
[58] Field of Search ........................... 364/200, 900

[56] References Cited

U.S. PATENT DOCUMENTS

4,486,826 12/1984 Wolff et al. ..................... 364/200
4,509,116 4/1985 Lackey et al. .................. 364/200
4,547,849 10/1985 Louie et al. ..................... 364/200

*Primary Examiner*—David Y. Eng
*Attorney, Agent, or Firm*—Antonelli, Terry, Stout & Kraus

[57] ABSTRACT

A co-processor control method intended to speed up data transfer linkage between the co-processor and memory when the co-processor is activated by the main processor, in such a way that the main processor issues an active control signal to the co-processor in the cycle of reading out an operand in the memory onto the data bus by being addressed by the main processor so that the operand on the data bus is directly delivered to the co-processor.

5 Claims, 13 Drawing Sheets

OPERAND FETCH

METHOD FOR FAST ESTABLISHING A CO-PROCESSOR TO MEMORY LINKAGE BY MAIN PROCESSOR

BACKGROUND OF THE INVENTION

This invention relates to the interface between a main processor and co-processor, particularly to a control method suitable for the speed-up of operand fetching from memory and also for storing the operational result in memory in executing a co-processor instruction.

A trend of computer system design, in which the main processor has basic arithmetic processing functions, is the provision of a co-processor which supports special arithmetic functions required for the system in the form of expanded main processor instructions. In the interface system for the co-processor requesting two bus cycles for fetching an operand into the co-processor, i.e., from memory to main processor, and then from main processor to co-processor, as described in the MOTOROLA 68020 User's Manual (referred to as Citation-1 hereinafter), there is a shortcoming in that a great linkage time is required for the main processor and co-processor. Although the linkage time does not appear to be critical when the memory access time is incomparably greater than the data transfer time between the main processor and co-processor, the speed-up of operation for the system with two-bus cycles is limited when a cache memory system or fast memory system is employed.

In the case of the co-processor described in the INTEL iAPX 86 REFERENCE MANUAL (referred to as Citation-2 hereinafter), the co-processor becomes the bus master occupying the bus to transfer data from the storage unit. This system allows data transfer in one bus cycle, but needs individual hardware for decoding the instruction and calculating the effective address, which could be shared with the main processor, and further needs the bus interface for the bus master. The instruction architecture of the case of Citation-1 results in double the hardware needed by the co-processor.

SUMMARY OF THE INVENTION

An object of this invention is to provide a co-processor control method which enables fast linkage between co-processor and memory when the main processor activates the co-processor.

Figure 1A:
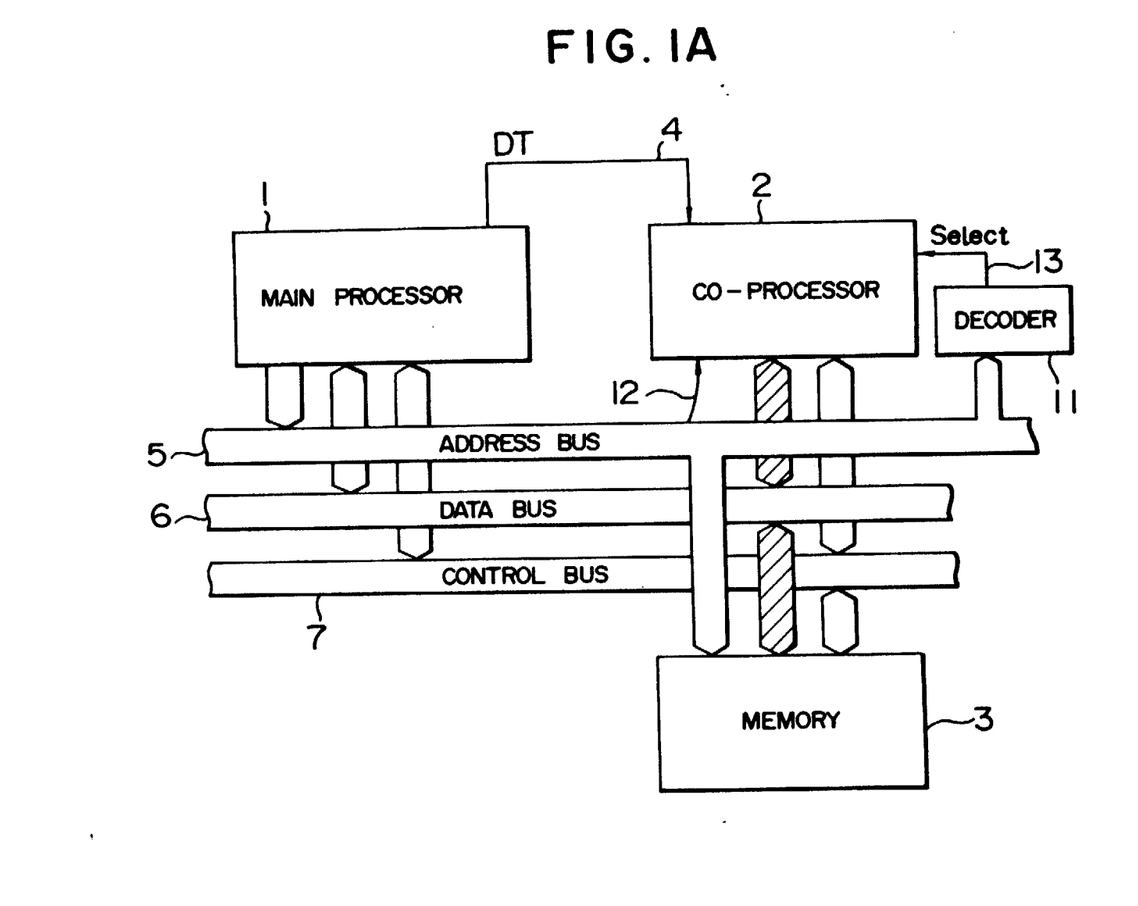
FIGS. 1A, 1B and 1C are diagrams showing the inventive system arrangement and the protocol of data transaction.
Figure 1B:
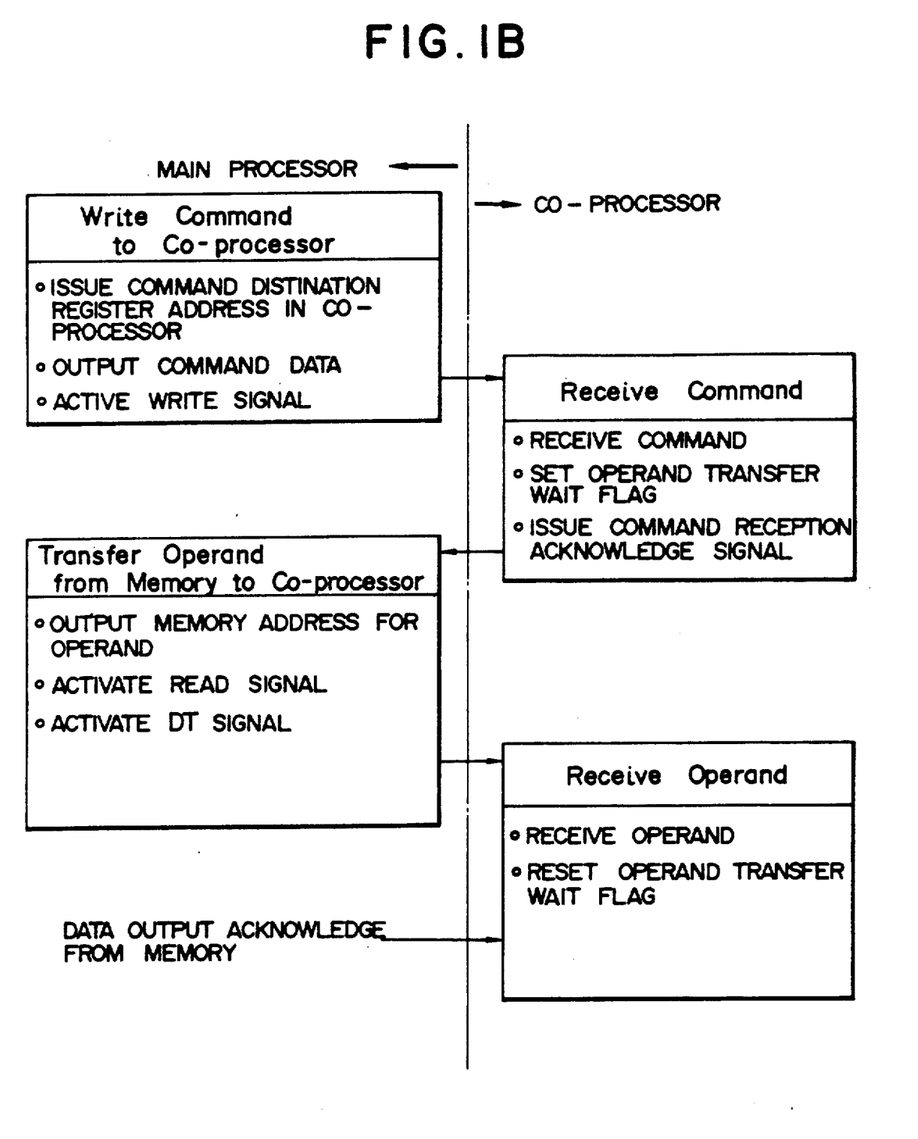

The present invention resides characteristically in the system arrangement shown in FIG. 1A, in which when a main processor 1 activates a co-processor 2 having its operand data in a memory 3, the main processor 1 issues an active control signal DT to the co-processor 2 in the bus cycle for reading out operand data from the memory 3 addressed by the main processor 1 onto a data bus 6, so that the operand data is directly received by the co-processor. FIG. 1B shows the protocol of this operation. The invention also features that the computational result in the co-processor 2 is written directly into the memory 3 in response to the control signal DT in accordance with the protocol shown in FIG. 1C.

DESCRIPTION OF THE PREFERRED EMBODIMENT

Figure 1C:
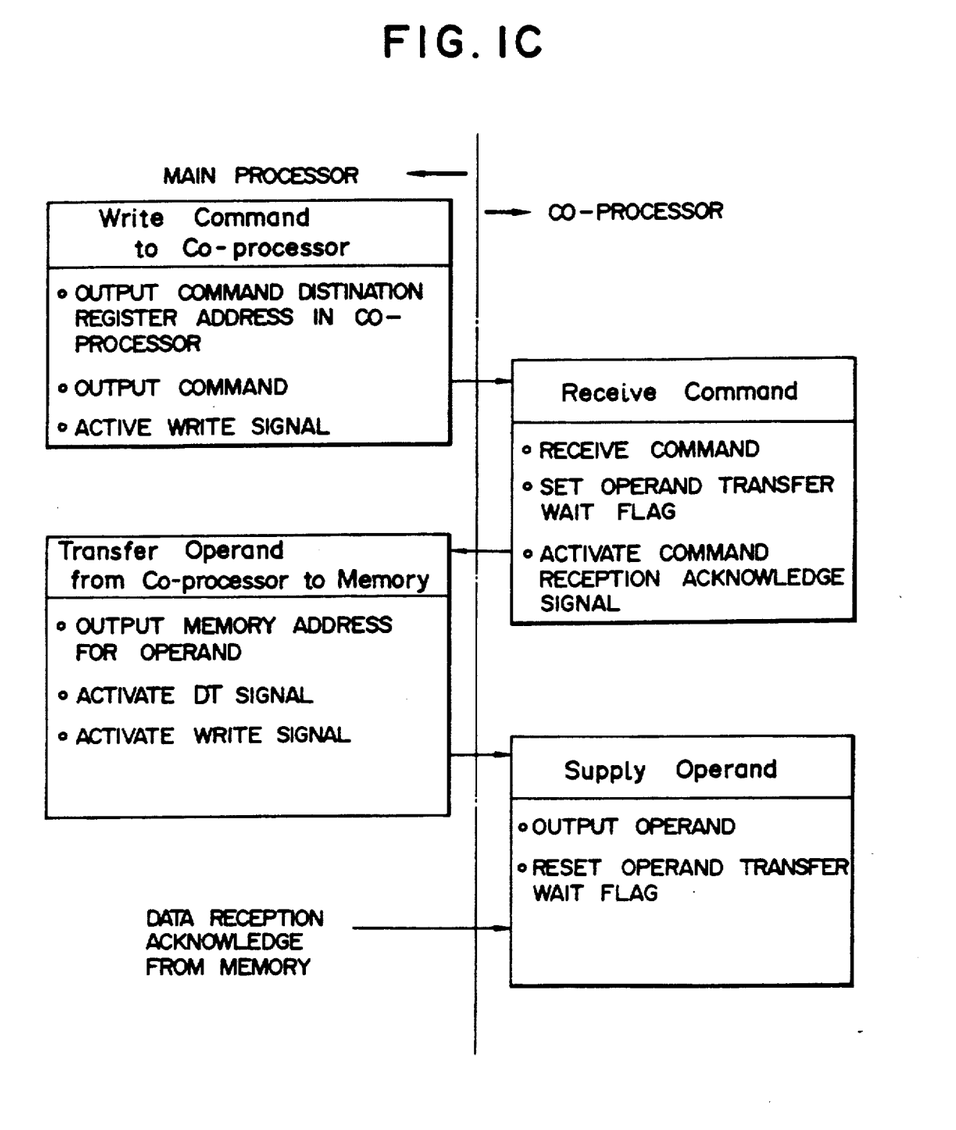
Figure 2:
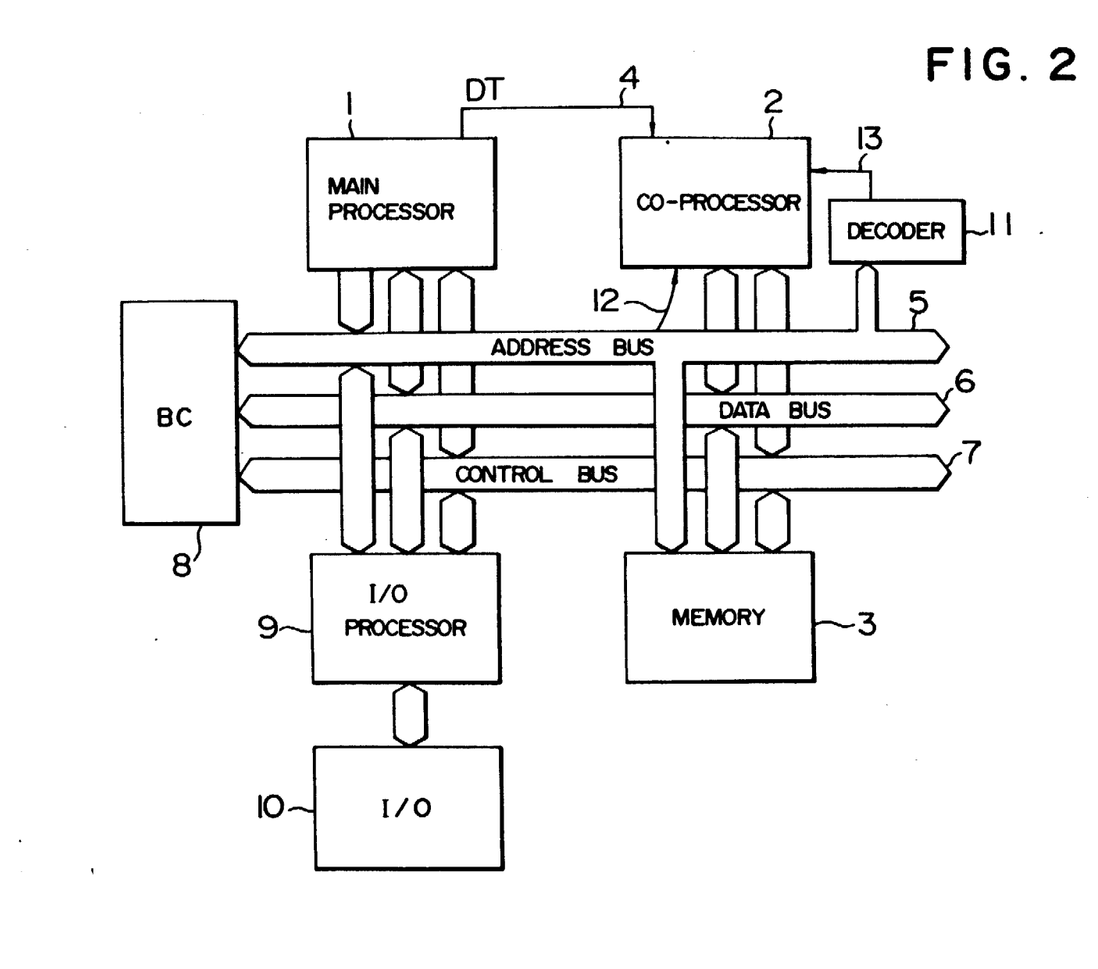
FIG. 2 is a block diagram showing the overall system hardware arrangement embodying the present invention.

An embodiment of the present invention will now be described. FIG. 1A is a diagram explaining the basic operation of the main processor 1 in activating the co-processor 2, FIG. 1B shows the system protocol of the case in which the main processor 1 receives an operational instruction for the co-processor 2, activates the co-processor 2 and transfers the operand in the memory 3 to the co-processor 2, and FIG. 1C shows the system protocol of data transfer of the case in which the main processor 1 receives an instruction for storing the operational result produced by the co-processor 2 in the memory 3. In both the cases of FIGS. 1B and 1C, the main processor 1 issues a command to the co-processor, calculates the effective address for it and initiates the operand transfer, while the co-processor 2 solely transacts operand data in response to the command from the main-processor 1. The inventive computer system shown in FIG. 2 includes a main processor 1 which implements the instruction decoding, address calculation and basic arithmetic/logic operation, a co-processor 2 which implements the floating-point arithmetic operation, a memory 3 which stores macro instructions and data for the main processor 1 and co-processor 2, an address bus 5, a data bus 6 and a control bus 7, all connecting the devices 1, 2 and 3, a bus controller 8 which controls the use of the buses, an input/output (I/O) port 10, an I/O processor 9 which implements the data transfer between the memory 3 and I/O port 10, a control line DT 4 for delivering the control signal from the main processor 1 to the co-processor 2, and a decoder 11 which decodes the address to produce the select signal 13 for the co-processor 2. The main processor 1 and I/O processor 9 operate as a bus master, while the co-processor 2, memory 3 and bus controller 8 operate solely as a slave. The main processor 1 operates on the co-processor 2 over the control line 4 to carry out data transfer to/from the memory 3, as will be described in more detail later. In FIG. 2, when the address of the co-processor 2 is provided on the address bus 5, it is decoded by the decoder 11 to produce an active select signal 13 to the co-processor 2. Another signal 12 is part of the address signals, and it is used to select one of the co-processors registers existing in the address space of the co-processor 2.

Figure 3:
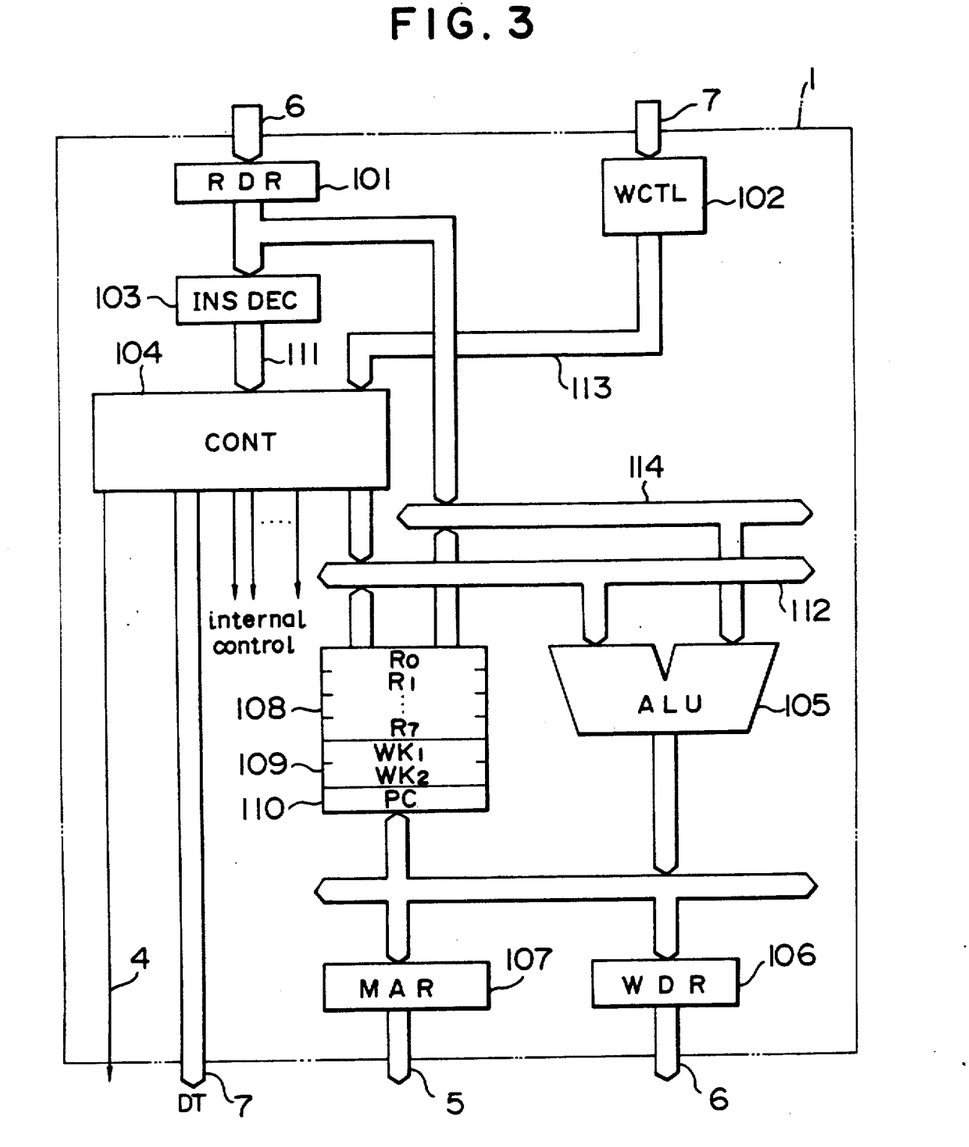
FIG. 3 is a block diagram showing the inventive main processor hardware arrangement.

FIG. 3 shows the arrangement of the main processor 1. A read data register (RDR) 101 receives on the data bus 6 a macro instruction or computation data from the memory 3. An instruction decoder (INSDEC) 103 receives the macro instruction from the RDR 101 and produces the starting address 111 of the micro program. A controller (CONT) 104 receives the micro program starting address provided by the instruction decoder 103 and produces on a micro program basis the internal control signals, the external control signals to be sent over the control bus 7, and the data transfer control signal DT 4 to the co-processor 2. A wait controller (WCTL) 102 is to control the wait state for the external acknowledgement for the access made by the main processor 1, and it imparts the access completion 113 to the controller 104. An arithmetic/logic unit (ALU) 105 performs the basic arithmetic and logic operations. Registers (R0-R7) 108 are a set of general-purpose registers which can be addressed by macro instructions. Work registers (WK1, WK2) 109 are used as a temporary storage in executing a macro instruction. A program counter (PC) 110 provides a pointer for fetching a macro instruction. A memory address register (MAR) 107 is to hold address data to be sent out over the address bus 5. A write data register (WDR) 106 is to hold data to be sent out over the data bus 6. In FIG. 3, the WCTL 102 is a circuit for timing the control bus 7 so as to provide synchronized signals 113 derived from the read, write, activate and termination acknowledge control signals on the control bus 7. Buses 112 and 114 are data buses to the ALU 105, the former carrying data from the register file (108, 109, 110) and immediate data from the controller, while the latter carrying data from the register file or operand data from the RDR 101.

Figure 4:
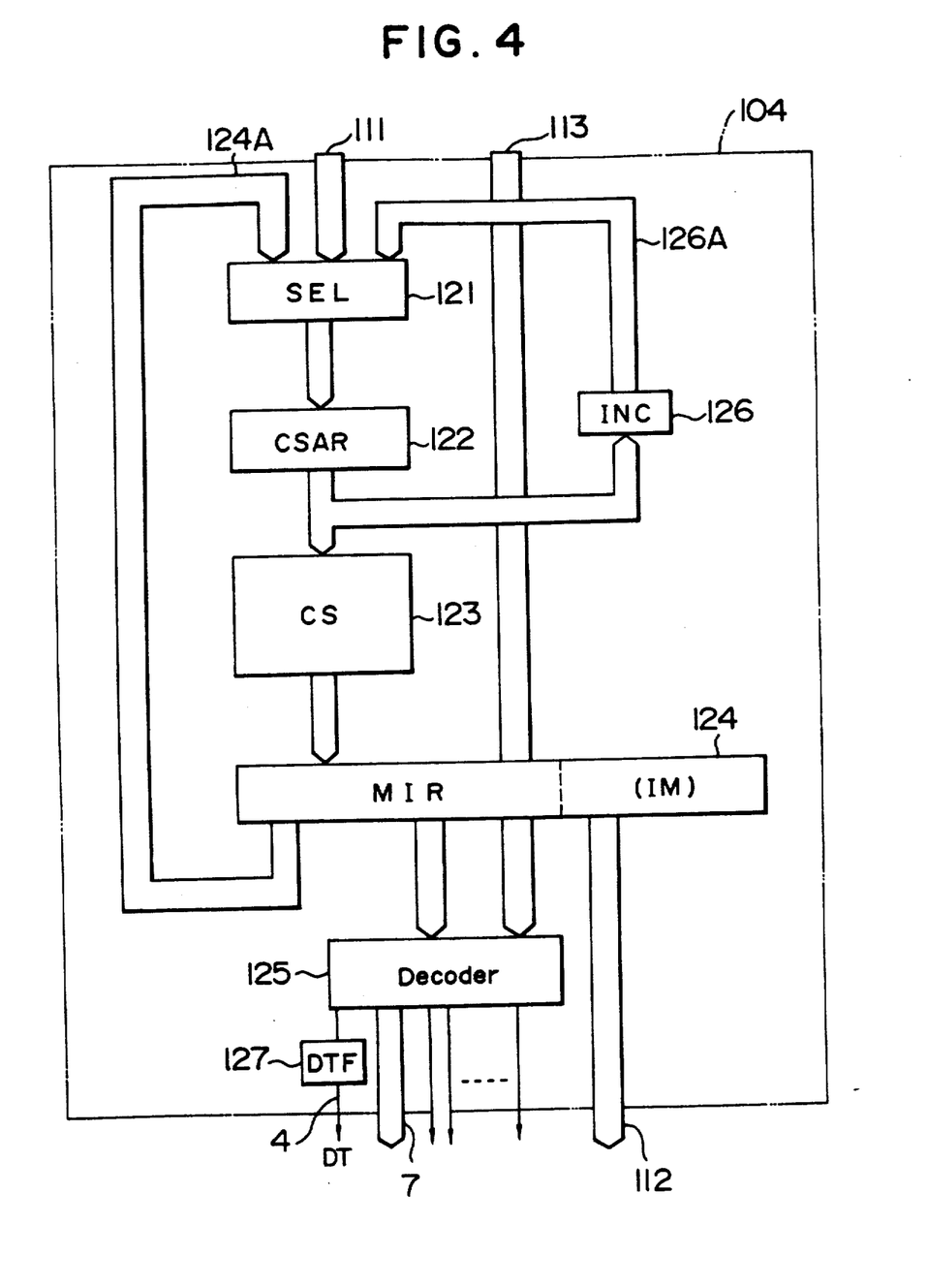
FIG. 4 is a block diagram showing the inventive hardware arrangement of the main processor controller.

FIG. 4 shows the arrangement of the controller 104. A selector (SEL) 121 selects one of the micro program starting address 111 provided by the instruction decoder 103, the jump address 124A specified in the current micro instruction, or the address 126A next to the current micro instruction. A control storage address register (CSAR) 122 is to latch the address selected by the selector 121 for reading out the content of a control storage (CS) 123. A micro instruction register (MIR) 124 is to latch a micro instruction read out of the control storage 123, and a micro instruction may include a jump address 124A or an immediate data. A decoder 125 produces the control signal DT in response to data from the MIR 124 or the external access acknowledgement. A direct transfer flag (DTF) 127 is set when the system enters the cycle of direct data transfer between the co-processor 2 and the memory 3. The data transfer flag (DTF) 127 provides its output through the DT 4 to the co-processor 2. A control storage address incrementer (INC) 126 is to calculate the next address based on the current execution address.

Figure 5:
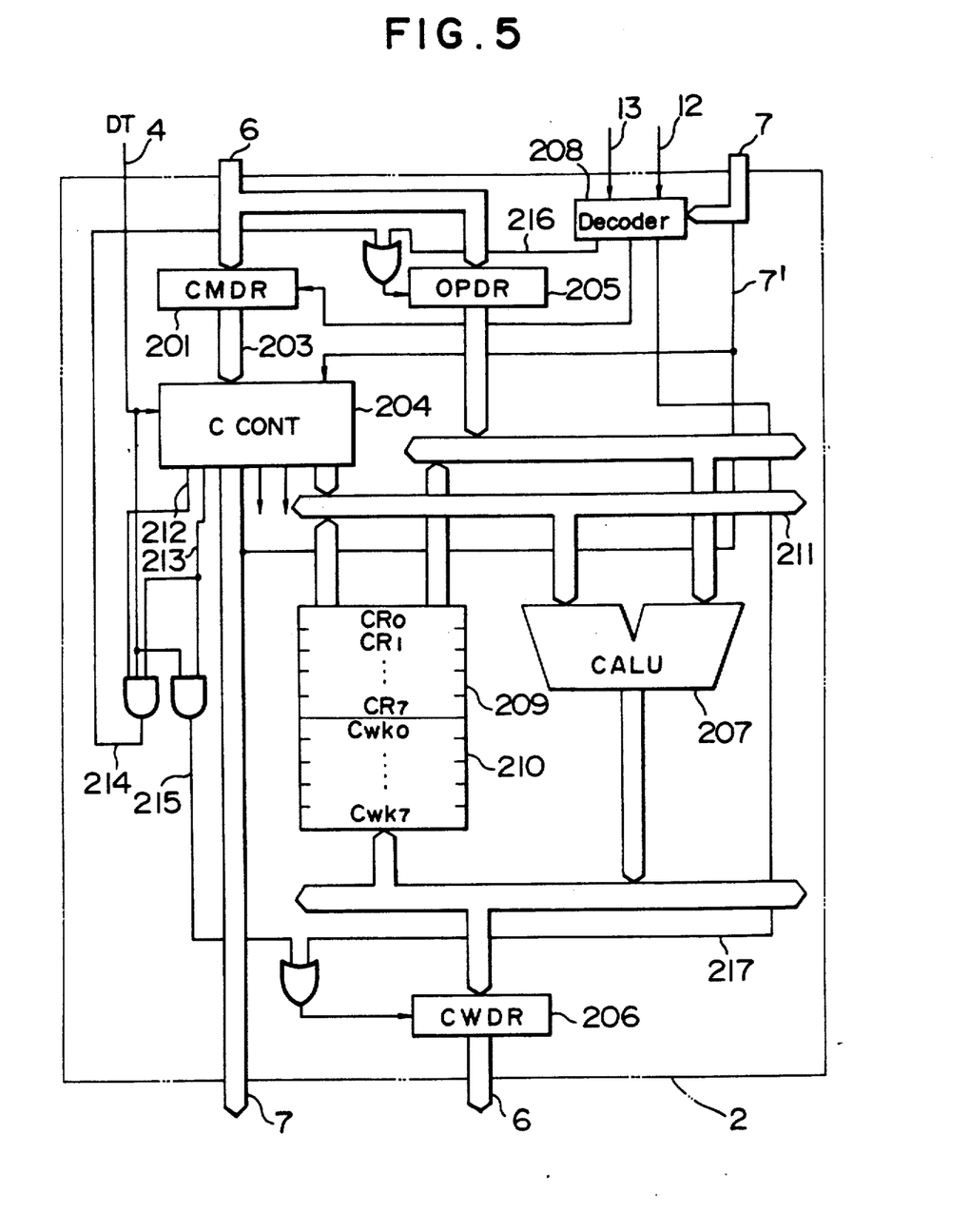
FIG. 5 is a block diagram showing the inventive co-processor hardware arrangement.

FIG. 5 shows the arrangement of the co-processor 2. A command register (CMDR) 201 is an input register for receiving an operational command from the main processor 1 in response to the signal from the decoder 208. An operand register (OPDR) 205 is an input register for receiving an operand when the output signal 216 of the decoder 208 or the signal 214 is active. A controller (CCONT) 204 receives the command signal 203 from the CMDR 201 to produce the internal control signals, the external control signals to be sent over the control bus 7, the signal 212 indicating the operand input wait state, and the signal 213 indicating the operand output wait state. The OPDR 205 receives data on the data bus 6 when all of the signal 212, the signal DT 4 and the read access or write access acknowledge signal Xack 7' on the control bus 7 are active. When the signal 213 and DT 4 are both active, data in a write data register (CWDR) 206 is read out onto the data bus 6. The CWDR 206 also outputs data in response to the output signal 217 of the decoder 208. The CALU 207 is an arithmetic unit for implementing floating-point operations. Co-processor registers (CR) 209 are a set of general-purpose registers which can be specified as operands of a macro instruction. Co-processor work registers 210 are used as a temporary storage for data during the execution of a command entered in the CMDR 201.

Figure 6:
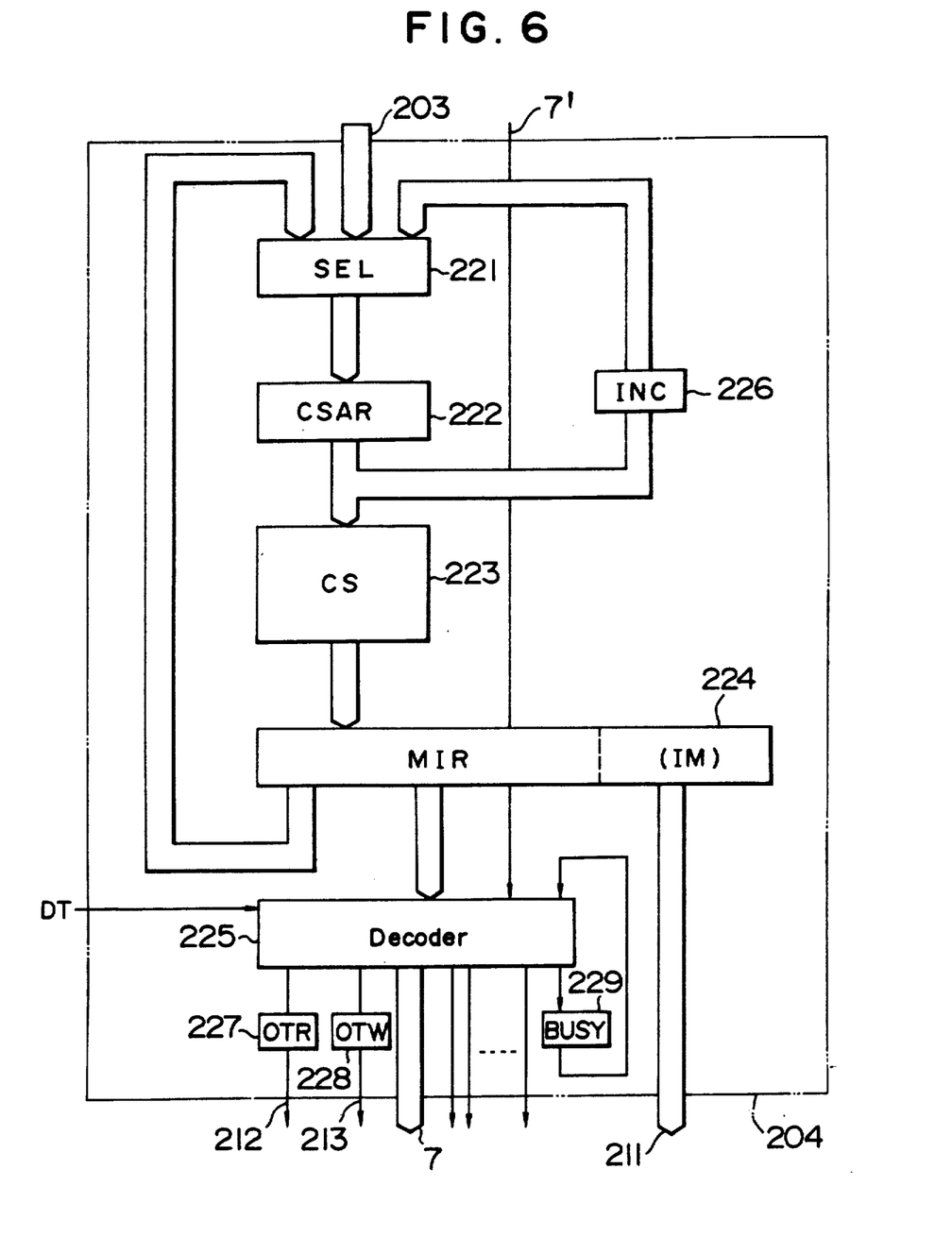
FIG. 6 is a block diagram showing the inventive hardware arrangement of the co-processor controller.

FIG. 6 shows the arrangement of the controller (CCONT) 204. The CCONT 204 is a microprogrammed controller, and the command signal 203 given by the CMDR 201 corresponds to the starting address of the microprogram. Functional blocks SEL 221, CASAR 222, CS 223, MIR 224 and INC 226 are identical to the SEL 121, CSAR 122, CS 123, MIR 124 and INC 126 shown in FIG. 4. A decoder 225 responds to the output of the MIR 224 and the acknowledge signal Xack 7' to produce the internal control signals and outputs to be sent over the control bus 7, and also control the state of an operand input wait flag (OTR) 227, operand output wait flag (OTW) 228 and command-in-execution flag (BUSY) 229. When the BUSY flag 229 is set, the command write acknowledge is not issued, and the next command reception is left waiting. The signal DT is received by the decoder 225. The DT signal indicates that the operand transfer for the co-processor computation is being carried out by the main processor 1, and when the co-processor 2 is in a wait state of operand reading, an active DT signal sets the OTR 227, or when the co-processor 2 is in a wait state of storing the operational result, an active DT signal sets the OTW 228 via the decoder 225. Upon completion of data transfer, the OTR 227 and OTW 228 are reset in response to the access acknowledge signal Xack 7'.

Figure 7:
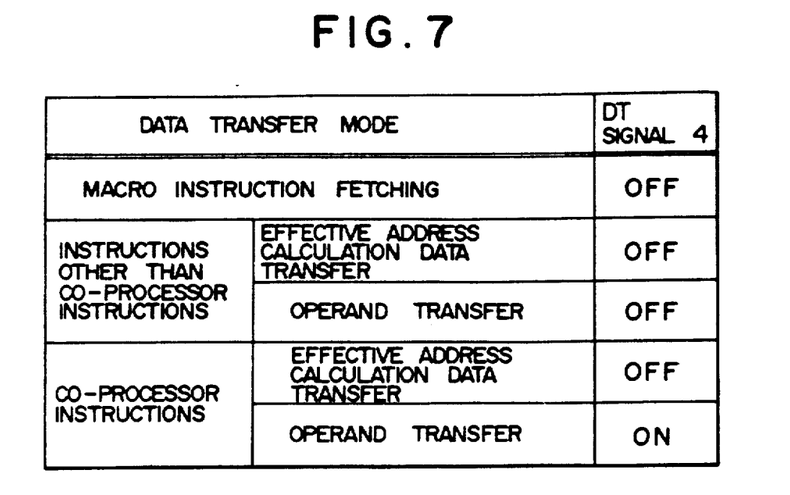
FIG. 7 is a table used to explain the control signals issued by the main processor to the co-processor.

FIG. 7 lists the types of data transfer modes and the state of the signal DT 4 in each mode. The table shows that the signal DT 4 is made active only in the operand transfer for a co-processor instruction. The signal is controlled entirely by the microprogram of the main processor, and its detailed procedure is described in FIG. 8.

Figure 8:
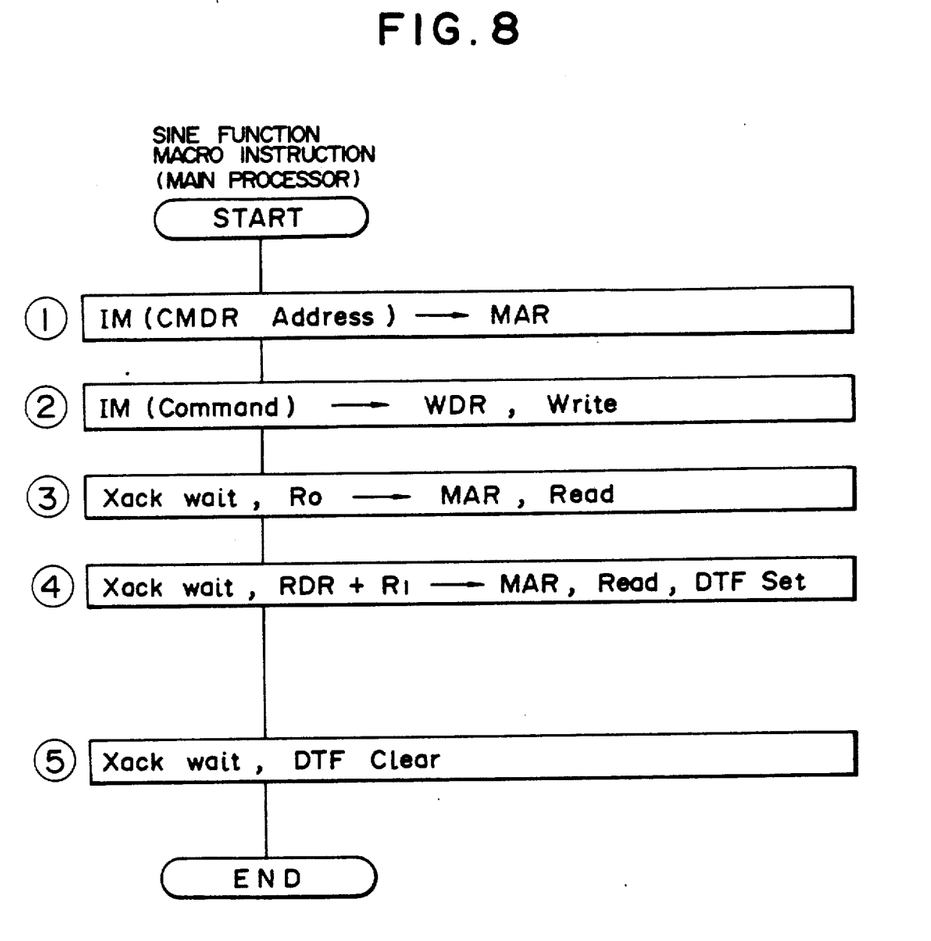
FIG. 8 is a flowchart explaining the main processor control for activating the co-processor and delivering its operand.

FIG. 8 shows the microprogram for fetching a co-processor instruction in the operation of a sine function including operand transactions by the main processor in an indirect memory addressing mode. Step 1 is to set immediate data from the MIR 124 (FIG. 4) to the MAR 107 (FIG. 3), where the immediate data is the address of the CMDR 201 (FIG. 5) in the co-processor 2. In step 2, immediate data in the MIR 124 is set in the WDR 106, and the write signal on the control bus 7 is made active. In step 3, upon receiving the acknowledge signal Xack 7' on the control bus 7 for the write access in step 2, data for the effective address calculation is set in the MAR 107 (FIG. 3), and the read signal is made active on the control bus 7. In step 4, upon receiving the acknowledge signal Xack 7' for the read access in step 3, the contents of the RDR 101 and the Ro which is one of the R108 (FIG. 3) are added by the ALU 105, with the result being set in the MAR 107, and then the read signal is made active and set in the DTF 127. In step 5, upon receiving the acknowledge signal Xack 7' in the step 4, the DTF 127 (FIG. 4) is cleared.

Figure 9:
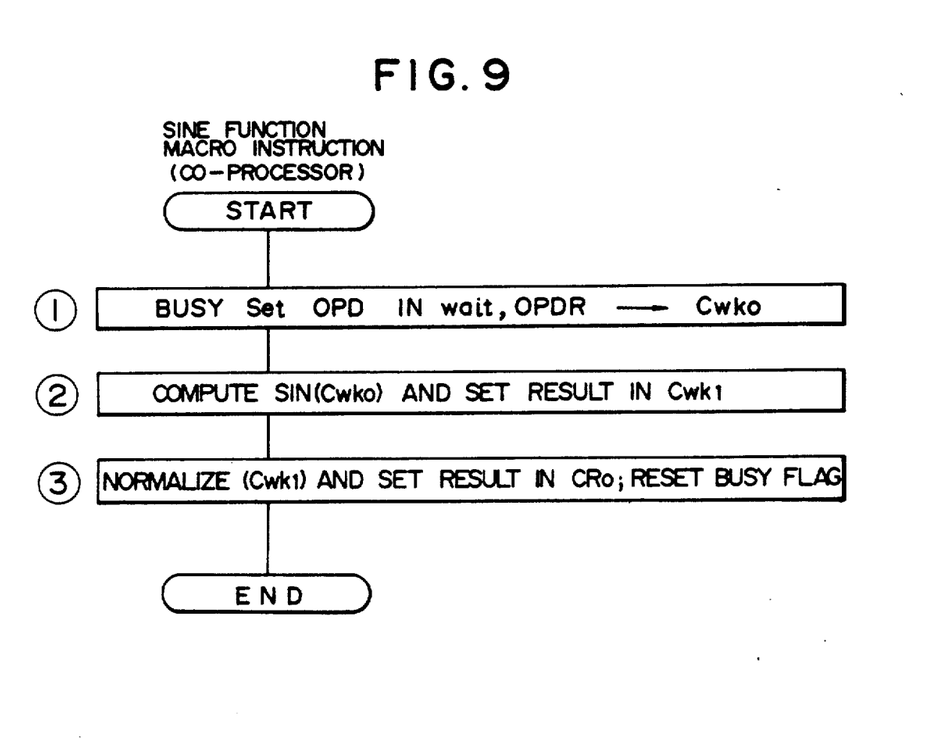
FIG. 9 is a flowchart explaining the co-processor control for receiving an operand.

FIG. 9 shows the microprogram of the co-processor 2. The program is initiated in the above-mentioned step 2 cf the main processor. In step 1, the BUSY flag 229 and OTR flag 227 are set, and when the signal DT 4 and acknowledge signal Xack 7' have become active, data on the data bus 6 is entered to the OPDR 205 (FIG. 5), the OTR flag 227 (FIG. 6) is reset, and an operand in the OPDR 205 is set in CWKo which is one of the CWK 210. In step 2, the sine operation takes place for the CWKo content, and the result is set in CWK1. In step 3, data in CW1 is normalized and set in CRo which is one of the CR 209, and the BUSY flag 229 (FIG. 6) is reset. These are the execution of a macro instruction by the micro programs in the main processor and co-processor, and the result is held in one of the CR 209 in the co-processor 2.

Figure 10:
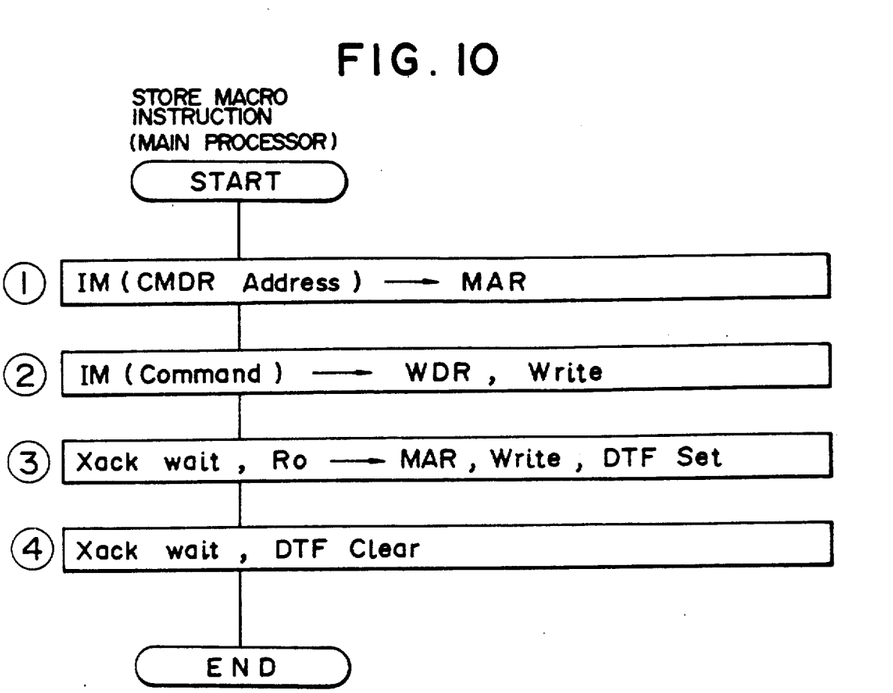
FIG. 10 is a flowchart explaining the main processor control for activating the co-processor and storing its resultant operand in the memory.

FIG. 10 shows the microprogram of the main processor 1 for the macro instruction (STORE) for transferring the above-mentioned operational result from CRo to the memory 3. In steps 1 and 2, the command is entered to the co-processor 2, and upon receiving the acknowledge in step 3 the effective address Ro of the resultant operand is held in the MAR 107 and the write signal is activated and set in the DTF 127. In step 4, upon receiving the acknowledge Xack 7' for the access in step 3, the DTF 127 is cleared.

Figure 11:
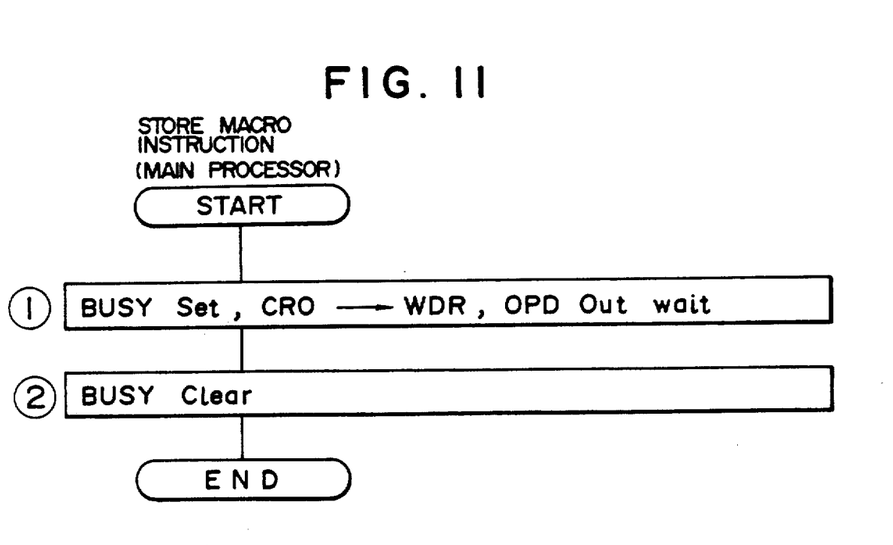
FIG. 11 is a flowchart explaining the co-processor control for outputting its operand.

FIG. 11 shows the microprogram of the co-processor 2 for the STORE instruction. In step 1, the BUSY flag 229 is set, data in CRo is set in the CWDR 206, and the OTW flag 228 is set. With the DT 4 being active, data in the CWDR 206 is outputted onto the data bus 6, and when the acknowledge signal Xack 7' becomes active, the OTW flag 228 is reset.

Figure 12A:
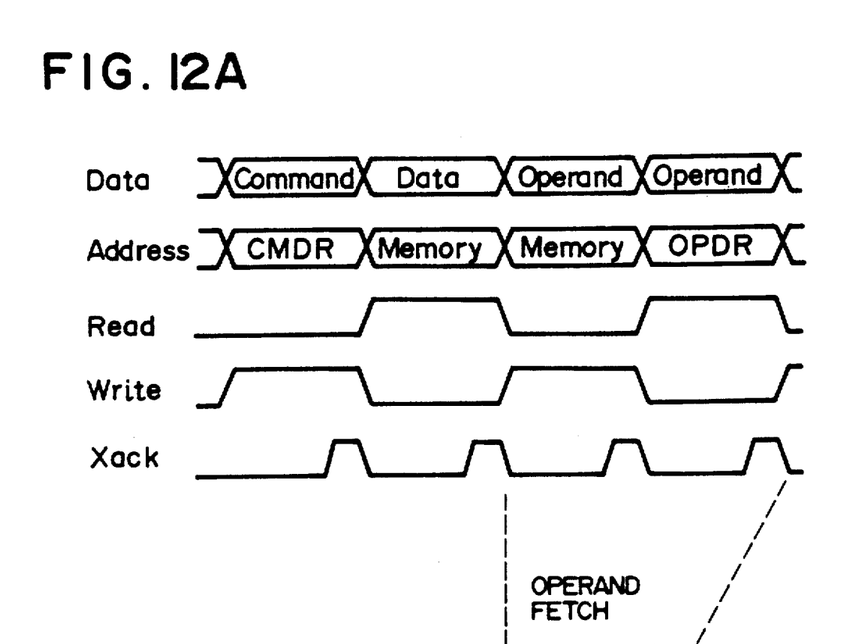
FIGS. 12A and 12B are timing charts comparing the performance of operand fetching to the co-processor according to the conventional system and the inventive system.
Figure 12B:
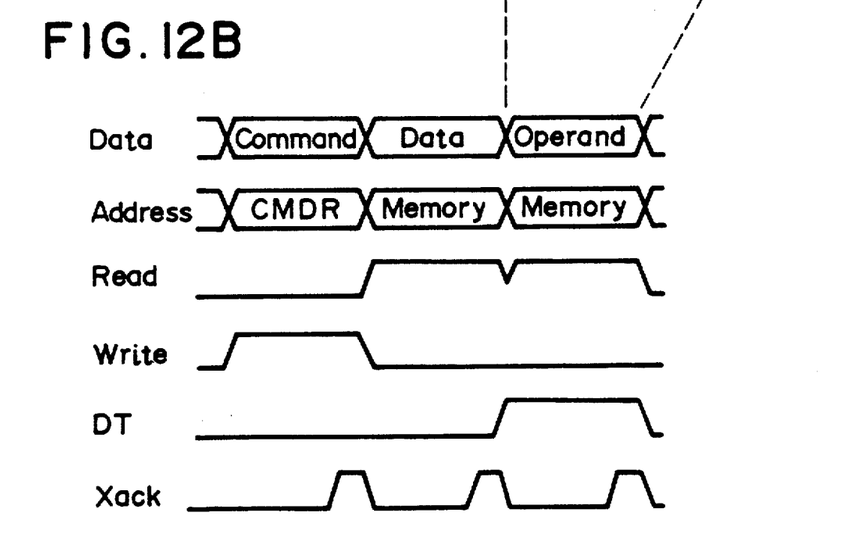

FIG. 12 is a set of timing charts for the control operations shown in FIGS. 8 and 9, chart (a) being of the conventional system (Citation-1), and chart (b) being of the inventive system. The inventive system is capable of fetching an operand twice as fast as the conventional system, and it is 1.3 times faster even for the count inclusive of command fetching and data fetching for effective address calculation by the main processor. Furthermore, in memory operand transfer in register indirect addressing mode that is most frequently used in floating arithmetic operations and in double-precision arithmetic operations, the conventional system needs five bus cycles, i.e., command transfer plus two memory read-out plus two operand transfer, whereas the inventive system needs only three bus cycles, i.e., command transfer plus two operand transfer, resulting in a performance enhancement by 1.6 times.

Figure 13A:
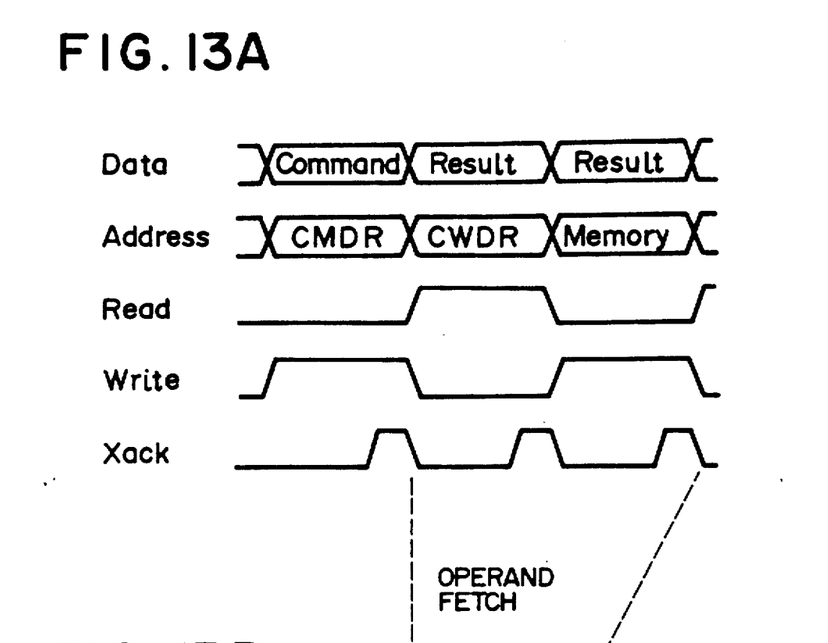
FIGS. 13A and 13B are timing charts comparing the performance of operand storing from the co-processor to the memory according to the conventional system and the inventive system.
Figure 13B:
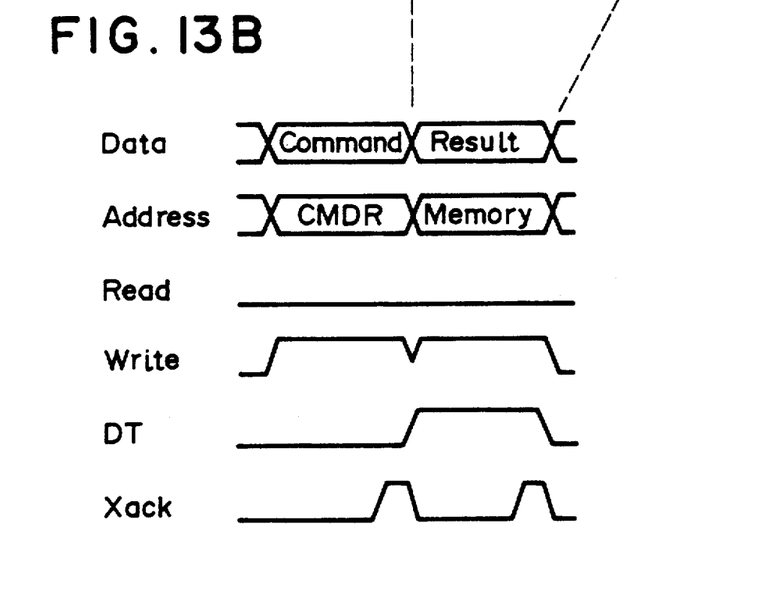

FIG. 13 is a set of timing charts for the control operations shown in FIGS. 10 and 11, chart (a) being of the conventional system (Citation-1), and chart (b) being of the inventive system. As in the cases of FIG. 12, the inventive system is capable of operand output twice as fast as the conventional system.

According to this invention, as described above, operand data transfer from memory to co-processor and resultant data transfer from co-processor to memory can take place approximately twice as fast as the conventional system and, at the same time, bus occupation in these operations can be halved, without adding the effective address calculation facility and the bus master interface hardware to the co-processor.

We claim:

1. In a computer system including a main memory, a main processor for implementing basic computational functions, and co-processor for implementing special computational functions, and a data bus connected to said main memory, said main processor and said co-processor, the improvement comprising:

said main processor having means for identifying an instruction to be executed by said co-processor, means for calculating an effective address of an operand of said instruction in said main memory, means for reading out said operand from said main memory onto said data bus, and means for sending to said co-processor a control signal which indicates that said main memory is outputting said operand onto said data bus; and said co-processor having means for fetching said operand from said data bus in response to receipt of said control signal.

2. In a computer system including a main memory, a main processor for implementing basic computational functions, a co-processor for implementing special computational functions, and a data bus connected to said main memory, said main processor and said co-processor, the improvement comprising:

said main processor having means for identifying an instruction to be executed by said co-processor, means for issuing a command to co-processor in response to identification of said instruction, means for calculating an effective address of an operand of said instruction in said main memory, means for reading out said operand from said main memory onto a data bus, and means for sending to said co-processor a control signal which indicates that said main processor is accessing said main memory in order to read out said operand onto a data bus;

said co-processor having means for receiving said operand from said main memory, means for causing said receiving means to enter a wait state in response to receipt of said command issued by said main processor, and means for fetching said operand to said receiving means from said data bus in response to receipt of a data output acknowledgement signal from said main memory when said control signal has been received from said main processor while said receiving means is in said wait state.

3. A computer system according to claim 2, wherein said receiving means comprises means which enters an operand transfer state from said wait state in response to receipt of said control signal from said main processor, and said fetching means comprises means for reading said operand from said data bus in response to a data output acknowledgement from said main memory when said receiving means is in said operand transfer state.

4. A control method according to claim 2, wherein said main processor further comprises means for indicating a state of data transfer for said operand to said co-processor, and means for transmitting said control signal to indicate said data transfer state to co-processor.

5. In a computer system including a main memory, a main processor for implementing basic computational functions, a co-processor for implementing special computational functions, and a data bus connected to said main memory, said main processor and said co-processor, the improvement comprising:

said main processor having means for identifying an instruction for storing an operand held in a register of said co-processor into said main memory, means for calculating an effective address in which said operand is to be stored in said main memory, means for transmitting said address to said main memory, and means for sending to said co-processor a control signal which indicates that said main processor is accessing said main memory to initiate the storing of an operand placed on said data bus into said main memory; and said co-processor having means for outputting said operand from said register to said data bus in response to said control signal.

* * * * *